UNITED STATES PATENT OFFICE.

ALICE MOORE AND FREDERICK J. A. KING, OF VANCOUVER, BRITISH COLUMBIA, CANADA.

COMPOSITION OF MATTER TO FACILITATE THE WHIPPING OF CREAM.

1,253,706.     Specification of Letters Patent.     Patented Jan. 15, 1918.

No Drawing.     Application filed September 25, 1917. Serial No. 193,089.

*To all whom it may concern:*

Be it known that we, ALICE MOORE and FREDERICK J. A. KING, a citizen of the Dominion of Canada and subject of the King of Great Britain, respectively, residing at Vancouver, in the Province of British Columbia, Canada, have invented certain new and useful Improvements in Composition of Matter to Facilitate the Whipping of Cream, of which the following is a specification.

This invention relates to a composition of matter which, when added to cream, will facilitate the whipping of it, and will impart to the froth of the cream so whipped, a relative permanency in that state.

Difficulty is experienced in whipping cream unless it has a certain high percentage of butter fat, and even after the desired froth has been produced, it has frequently no stability in that condition but subsides quickly to its original liquid form.

It is to overcome these difficulties and enable a cream having a relatively low percentage of butter fat to be used, that the composition, which is the subject of this application, has been made.

The invention is particularly described in the following specification.

The invention comprises a composition of tartaric acid and lemon juice with a carbohydrate, such as cornstarch, the composition being in the proportion of one part by bulk of tartaric acid, two parts of lemon juice and two parts of cornstarch.

Any suitable flavoring or sweetening may be added as desired. Essence of lemon is preferred, as the same is found to further the desired object of facilitating the whipping of the cream.

A small quantity of this composition added to either fresh or condensed cream in the approximate proportion of one teaspoonful to a quart of cream enables the cream to whip freely to a froth and it will remain in that state indefinitely, irrespective of the temperature, within reasonable limits, to which it is exposed.

When the composition is put up in powdered form care should be taken to prevent the formation of lumps and the powder should be shaken into the cream while mixing and not merely thrown in at one time so that the powder may be properly dissolved during the mixing operation.

When the powder is put up in liquid form, *i. e.*, is dissolved in water, the cream should be poured into a basin or bowl of such size and form as will retain the cream within the range of the whipping action. The cream should be whipped well for three minutes before adding the composition and then three teaspoonfuls of the composition is added to every pint of cream, the whole amount of the composition being poured in at one time, not in separate spoonfuls, and whipped for one minute, by which time the froth will be set. If required very stiff, as for cake filling, use half as much again of the composition. These proportions are for condensed cream. If natural cream is used one-half the amount of the composition will serve the desired purpose.

Having now particularly described our invention, we hereby declare that what we claim as new and desire to be protected in by Letters Patent, is:

1. A composition of matter to facilitate the whipping of cream and to render it stable in the whipped condition, said composition comprising substantially one part by bulk of tartaric acid to two parts of lemon juice and two parts of a suitable carbohydrate.

2. A composition of matter for the purpose specified, comprising one part by bulk of tartaric acid, two parts of lemon juice and two parts of cornstarch.

In testimony whereof we affix our signatures.

MRS. ALICE MOORE.
FREDERICK J. A. KING.